Jan. 17, 1956
C. HUDRY
2,731,247
APPARATUS FOR MALAXING AND MIXING
Filed July 21, 1953
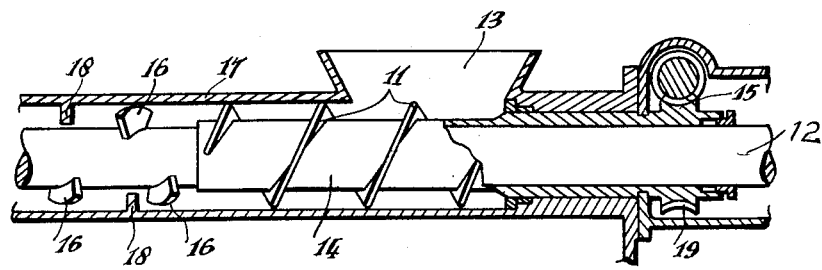
*Fig.1.*
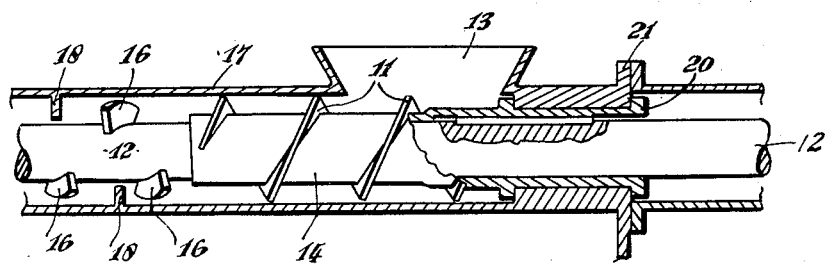
*Fig.2.*
INVENTOR
CHARLES HUDRY
BY 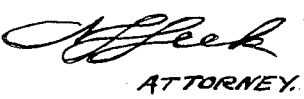
ATTORNEY.

United States Patent Office 2,731,247
Patented Jan. 17, 1956

2,731,247

APPARATUS FOR MALAXING AND MIXING

Charles Hudry, Roussillon, France, assignor to Societe Rhodiaceta, Paris, France, a body corporate of France Application July 21, 1953, Serial No. 369,338

Claims priority, application France April 11, 1953

3 Claims. (Cl. 259—6)

Apparatus for effecting continuous malaxing and mixing of various materials is known in which a cylindrical shaft having on its operating portion an interrupted worm thread is rotatable in the interior of a casing provided with inlet and outlet orifices and whose internal surface is provided with ribs, the casing and shaft being movable in relation to each other in a to-and-fro fashion. The rotation of the shaft and its reciprocating movement in relation to the casing are such that the ribs are able to pass continuously through the cut-out portions of the interrupted worm thread; this permits the obtention of a thorough malaxing and a very intimate mixing.

In known apparatus of the above type the material to be treated is led from the inlet orifice towards the operating zone of the machine by means of the action of a continuous worm thread on the shaft nearest the inlet portion of the apparatus which continuous thread is integral with the shaft and therefore undergoes an axial displacement in relation to the casing. Apparatus as described above will be referred to herein as apparatus of the type described.

One disadvantage of apparatus of the type described is that the material which is led in through the inlet orifice, immediately on its arrival in the apparatus, is submitted to a reciprocating movement in relation to the casing which alternately entrains the material in the direction of the exit orifice and then leads the material back in the opposite direction, while on the other hand the supply of the material continues to be effected at the same rate. As a result inequalities in the rate of feed occur which cause packing together of the material. This packing together is harmful to a good functioning of the apparatus and often causes stoppages. This is very undesirable for an apparatus whose purpose it is to be used for effecting a continuous process.

It is an object of the present invention to provide an apparatus of the type described in which the likelihood of stoppages occurring is reduced.

It is another object of the present invention to reduce or avoid the packing together of material nearer the entrance orifice in apparatus of the type described.

It is a further object of the present invention to provide a more even flow of material to the malaxing and mixing zone in apparatus of the type described than has hitherto been possible.

These and other objects which will become apparent hereinafter, are accomplished in accordance with the invention by an apparatus for continuously malaxing and mixing which comprises a cylindrical worm member having interrupted worm threads thereon, a casing having ribs on its inner surface and an entrance and exit orifice, said interrupted worm threads and ribs being rotatable and reciprocable relative to one another and cooperating with one another so as to permit passage of said ribs between the gaps in said interrupted worm threads, and an axially fixed continuous worm thread adjacent said entrance orifice inside said casing and rotatable but not reciprocable relative thereto, said continuous worm thread and interrupted worm threads forming a channel with said casing between said entrance and exit orifice.

It is thus seen that all relative axial movement between the casing and the continuous worm thread adjacent the inlet orifice of apparatus of the type described is suppressed. A rotating movement, by means of any appropriate device, may be imparted to the continuous worm thread independently from the rotating movement of the interrupted worm threads; however, it is also possible to entrain the continuous worm thread by the rotary movement of the interrupted worm threads.

The following two embodiments of apparatus in accordance with the invention are illustrated in the accompanying diagrammatic drawings, both embodiments relating to the case where the casing is fixed while a simultaneous rotary and reciprocating movement is imparted to the worm member. In said diagrammatic drawings Figure 1 is views in part section of an embodiment of the apparatus and Figure 2 is views in part section of a modification of the embodiment shown in Figure 1.

The embodiment of the apparatus which is illustrated in Figure 1 has a worm member 12 provided with interrupted worm threads 16 inside a casing 17 having ribs 18 projecting from its inner surface. An exit orifice is provided at the extremity of the apparatus not shown. A continuous worm thread 11 carried on a sleeve 14 is slidably mounted on the cylindrical portion of the worm member 12 which member 12 is capable of being rotated and reciprocated by means not shown. The casing 17 has an entrance orifice 13 in the form of a feed hopper immediately above the continuous thread 11. It will be appreciated that the sleeve 14 is not entrained in either a rotary or reciprocating fashion when the member 12 is set in motion. A rotary movement is imparted to the sleeve 14 by a combination of geared toothed wheel 19 and worm screw 15 or by any other appropriate gearing system, said rotary movement being specific to the sleeve 14 and completely independent from the rotation of the worm member 12.

In using this device the angular speed of rotation of the continuous worm thread carried by the sleeve 14, which regulates the rate of feed of the apparatus, may be modified at will without changing the angular speed of rotation of the worm member 12. In this way it is possible to avoid packing together material fed into the apparatus round the continuous worm thread 11.

In the embodiment of the apparatus illustrated in Figure 2 a continuous worm thread 11 is carried as in the first embodiment on a sleeve 14 capable of sliding on the worm member 12. The sleeve 14 is slidably keyed onto the worm member 12 and comprises a shoulder 20 which bears against a bearing 21 provided for this purpose on the casing 17 of the apparatus. As a result, the sleeve 14 is entrained by the worm member 12 in its rotary movement without however participating in its reciprocating movement.

In using this device the angular speed of rotation of the continuous worm thread 11 carried on the sleeve 14 is the same as that of the worm member 12, but as the continuous worm thread 11 does not participate in the reciprocating movement on the worm member 12 the feed is effected in an even manner and without causing packing together round the continuous worm thread 11 of the material fed in.

It must be understood that the invention is not limited by the embodiments described above. It is also applicable to the case where only a rotary movement is imparted to the worm member, the relative axial movement of the casing and the worm member being effected by means of a reciprocating movement of the casing.

The apparatus arranged and constructed in accordance with the present invention may be used for all malaxing and mashing operations which it is desired to carry out in continuous fashion. In particular it gives very satisfactory results when it is used for continuous esterification of cellulose.

Although the present invention has been described with particular reference to specific details, it is not intended that such details shall be regarded as limitations upon the scope of the invention except insofar as included in the accompanying claims.

What I claim and desire to secure by Letters Patent is:

1. An apparatus for continuously malaxing and mixing, which comprises a cylindrical casing having discontinuous ribs on its inner surface and axially spaced entrance and exit orifices, a member carrying interrupted worm threads mounted for rotation and reciprocation in said casing so as to permit passage of said ribs between the gaps in said interrupted worm threads, and an axially fixed member carrying a continuous worm thread rotatably mounted in said casing adjacent said entrance orifice, said continuous worm thread and said interrupted worm thread forming a channel within said casing between said entrance and exit orifices.

2. An apparatus for continuously malaxing and mixing, which comprises a cylindrical casing having discontinuous ribs on its inner surface and having spaced entrance and exit orifices, an axially fixed sleeve carrying a continuous worm thread rotatably mounted in said casing adjacent said entrance orifice, a shaft carrying an interrupted worm thread mounted for reciprocation in said sleeve and for rotation independently thereof so as to permit passage of said ribs between the gaps in said interrupted worm thread, said continuous worm thread and said interrupted worm thread forming a channel within said casing between said exit and entrance orifices.

3. An apparatus for continuously malaxing and mixing, which comprising a cylindrical casing having discontinuous ribs on its inner surface and having spaced entrance and exit orifices, an axially fixed sleeve carrying a continuous worm thread rotatably mounted in said casing adjacent said entrance orifice, a shaft carrying an interrupted worm thread mounted for reciprocation in said sleeve and connected to be rotated therewith so as to permit passage of said ribs between the gaps in said interrupted worm thread, said continuous worm thread and said interrupted worm thread forming a channel within said casing between said exit and entrance orifices.

References Cited in the file of this patent

UNITED STATES PATENTS

| Number | Name | Date |
|---|---|---|
| 739,283 | Bonney | Sept. 22, 1903 |
| 1,181,973 | Tyson | May 2, 1916 |
| 2,020,878 | Doering | Nov. 12, 1935 |
| 2,059,435 | Brownlee | Nov. 3, 1936 |
| 2,249,263 | Wheelwright | July 15, 1941 |
| 2,431,274 | Osborne | Nov. 8, 1947 |
| 2,631,016 | Laubarede | Mar. 10, 1953 |